USO05669010A

United States Patent [19]

Duluk, Jr.

[11] Patent Number: 5,669,010
[45] Date of Patent: Sep. 16, 1997

[54] CASCADED TWO-STAGE COMPUTATIONAL SIMD ENGINE HAVING MULTI-PORT MEMORY AND MULTIPLE ARITHMETIC UNITS

[75] Inventor: Jerome F. Duluk, Jr., Santa Clara County, Calif.

[73] Assignee: Silicon Engines, Palo Alto, Calif.

[21] Appl. No.: 608,993

[22] Filed: Mar. 6, 1996

Related U.S. Application Data

[63] Continuation of Ser. No. 885,163, May 18, 1992.
[51] Int. Cl.[6] ........................................................ G06F 7/38
[52] U.S. Cl. .................. 395/800.22; 395/379; 395/562; 395/563; 395/586; 364/714; 364/724.011
[58] Field of Search .................................... 395/800, 375, 395/562, 563, 586; 364/724, 714

[56] References Cited

U.S. PATENT DOCUMENTS

| | | | |
|---|---|---|---|
| 4,841,467 | 6/1989 | Ho et al. | 364/748 |
| 5,128,888 | 7/1992 | Tamura et al. | 364/748 |

OTHER PUBLICATIONS

Bioastronomy—The Next Steps, Artificial Signal Detectors, 1988 by Linscott et al.
VLSI Processors for Signal Decection in SETI, 1986 by Duluk et al.
Artificial Signal Decectors, 1987 by Linscott et al.
The MCSA II —A Broadband, High Resolution, 60 Mchannel Spectrometer, Linscott et al.

Primary Examiner—Larry D. Donaghue
Attorney, Agent, or Firm—Flehr Hohbach Test Albritton & Herbert LLP

[57] ABSTRACT

A two-stage cascaded processor engine for Digital Signal Processing (DSP) utilizing parallel multi-port memories and a plurality of arithmetic units, including adders and multiplier-accumulators (MACs) is described. The engine supports a Single Instruction Multiple Data (SIMD) architecture. Conventional cascaded processors implementing an add-multiply-accumulate-add process for Short Length Transforms have significant limitations which are removed by the invention. The two stage processor uses two multiport memories. Arithmetic units (AU) in the top stage get their operands from a top multiport RAM and arithmetic units in the bottom stage get their operands from a bottom multiport RAM. AU outputs are stored back into the same stage as multiport RAM and passed either to the next stage or the output bus. The AU outputs can be both stored back into the same stages multiport RAM or passed either to the next stage or output multiplexer, or both of the previous. The system includes and input and output bus thus allowing simultaneous input and output operations. The AUs can also get upper ends from an auxiliary input buses to allow for operations on special data such as constant coefficients with elementary subroutines. The multiple two stage processors operate in an SIMD configuration, each processor receiving the same microcoded instruction from a microstore via a microinstruction bus. Various embodiments are described.

30 Claims, 10 Drawing Sheets

This Figure is Prior Art

CASCADED TWO-STAGE COMPUTATIONAL SIMD ENGINE HAVING MULTI-PORT MEMORY AND MULTIPLE ARITHMETIC UNITS

This is a continuation of application Ser. No. 07/885,163 filed 18 May 1992.

FIELD OF THE INVENTION

This invention relates to computer architectures and more particularly to Digital Signal Processing (DSP) computer architectures.

BACKGROUND OF THE INVENTION

In Digital Signal Processing (DSP), there is a need to perform numeric data processing at a very high rate. In many DSP applications, high data rate processing is achieved through the use of multiple Arithmetic Units (AU) such as combinations of adders, multipliers, accumulators, dividers, shifters, and multiplexors. However, there are two major difficulties with using many AUs in parallel: first, many control signals are needed to control many AUs; and, second, it is difficult to get the correct data words to each AU input on every clock cycle.

Some DSP architectures are Single Instruction Multiple Data (SIMD) architectures. A SIMD architecture, as defined here, groups its AUs into identical Processors, and these Processors perform the same operation on every clock cycle, except on different data. Hence, a Processor within a SIMD architecture can have multiple AUs, with each AU operating in bit parallel fashion (some definitions of SIMD architectures have AUs operating in bit serial fashion, which is not the case here). One application of a SIMD architecture is image compression, where an image is split into identically sized blocks. If there are four Processors, then four blocks within the image can be processed in parallel, and the Processors are controlled in parallel with the same instruction stream.

Many DSP applications, especially real-time applications, perform the same set of operations over and over. For example, in video compression, successive images are compressed continuously. Another example is in signal detection, where an input data stream in continuously monitored for the presence of a signal. Within these more complex functions, there are usually simpler functions such as convolution, Fourier transform, and correlation, to name only a few. These simpler functions can be viewed as subroutines of the complex functions. These simple functions can be broken down further into elementary subroutines; for example, the Discrete Fourier Transform (DFT) of an 8×8 data matrix can be implemented with 16 calls to an elementary subroutine which preforms an 8-point DFT. The present patent describes a SIMD architecture which efficiently performs a wide variety of elementary subroutines.

Many elementary subroutines of intrest can be described as a cascade of adds and multiplies, and architectures which are well matched to specific elementary subroutines can perform these elementary subroutines in a single pass. For example, Short Length Transforms (SLTs), such as the 8-point DFT, are described on pages 144 to 150 of H. J. Nussbaumer's book, Fast Fourier Transform and Convolution Algorithms (Second Edition), published by Springer-Verlag in 1990. In this book, SLTs are described as an add-multiply-accumulate-add process. That is, input data points are added and subtracted in various ways to form the first set of intermediate results; the first set of intermediate results are multiply-accumulated in various ways to form the second set of intermediate results; and the second set of intermediate results are added and subtracted in various ways to form the final results. The hardware for this three stage process of add-subtract, followed by multiply-accumulate, followed by add-subtract, is shown in FIG. 1. The architecture of FIG. 1 was utilized in the SETI DSP Engine design done at Stanford University in 1984, and is therefore, prior art for the present patent. The SETI DSP Engine architecture was published in four places: 1) "VLSI Processors for Signal Detection in SETI" by Duluk, et.al., 37th International Astronautical Congress in Innsbruck, Austria, Oct. 4–11, 1986; 2) "Artificial Signal Detectors" by Linscott, Duluk, Burr, and Peterson, International Astronomical Union, Colloquium No. 99, Lake Balaton, Hungary, June, 1987; 3) "Artificial Signal Detectors", by Linscott, Duluk, and Peterson, included in the book "Bioastronomy—The Next Steps", edited by Marx, Kluwer Academic Publishing, pages 319–335, 1988; and 4) "The MCSA II—A Broadband, High Resolution, 60 Mchannel Spectrometer", by Linscott, et. al. (including Duluk, the author of the present patent), 24th Annual Asilomar Conference on Circuits, Systems, and Conputers, November 1990.

The architecture of FIG. 1, which is prior art, can perform three arithmetic operations in parallel: two add-subtracts and one multiply-accumulate. The add-subtracts are performed in the Upper Adder 1 and the Lower Adder 3; while the multiply-accumulate is performed in the Middle Multiply-Accumulate 5. The parallelism of three simultaneous arithmetic operations is achieved through the use of multiport Random Access Memories (RAM), sometimes called multiport register files. The three multiport RAMs in FIG. 1 can perform ten simultaneous read or write operations. The Upper Four-port RAM 7 simultaneously performs: two read operations for the operands of the Upper Adder 1; one write operation for the Upper Adder 1 result; and one write operation for data from the Input/Output Bus 9. The Middle Two-port RAM 11 and the Lower Four-port RAM 13 perform similar functions.

The Processor architecture of FIG. 1, however, has limitations such as: i) requiring data to be multiplied by the value "one" to get from the output of the Upper Adder 1 to the input of the Lower Adder 3; ii) no provisions for directly manipulating complex numbers; iii) allowing only one multiply-accumulate per pass through the architecture, and hence, only one multiply-accumulate per elementary subroutine; iv) only one AU per stage; v) only one Input/Output Bus 9; and vi) it is highly specialized for SLT computaion. The Processor architecture of the present patent overcomes these limitations.

OVERVIEW OF THE INVENTION

Figure 1:
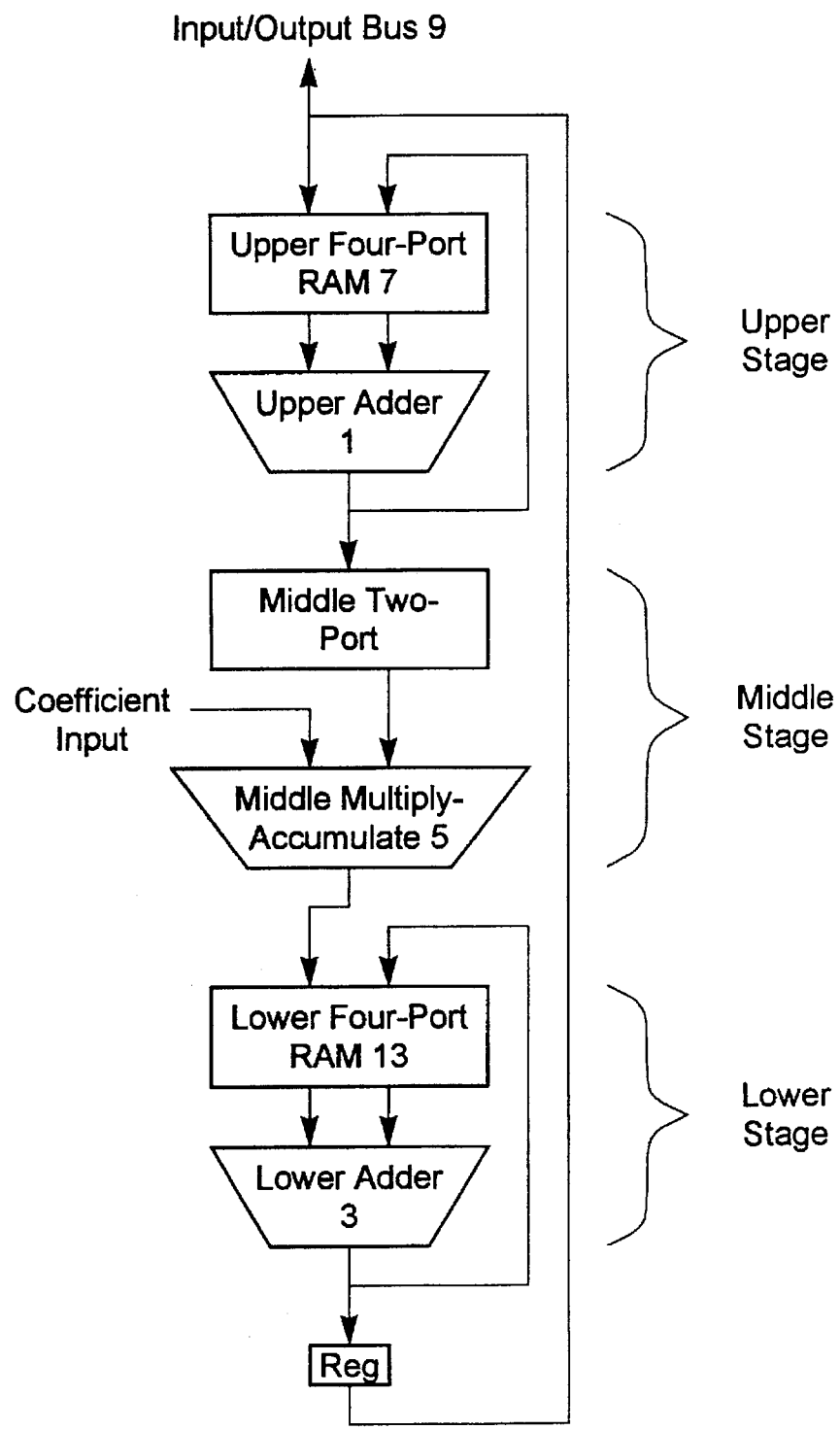
FIG. 1: Three stage Processor architecture for computing SLTs. This is prior art for the present patent.
Figure 2:
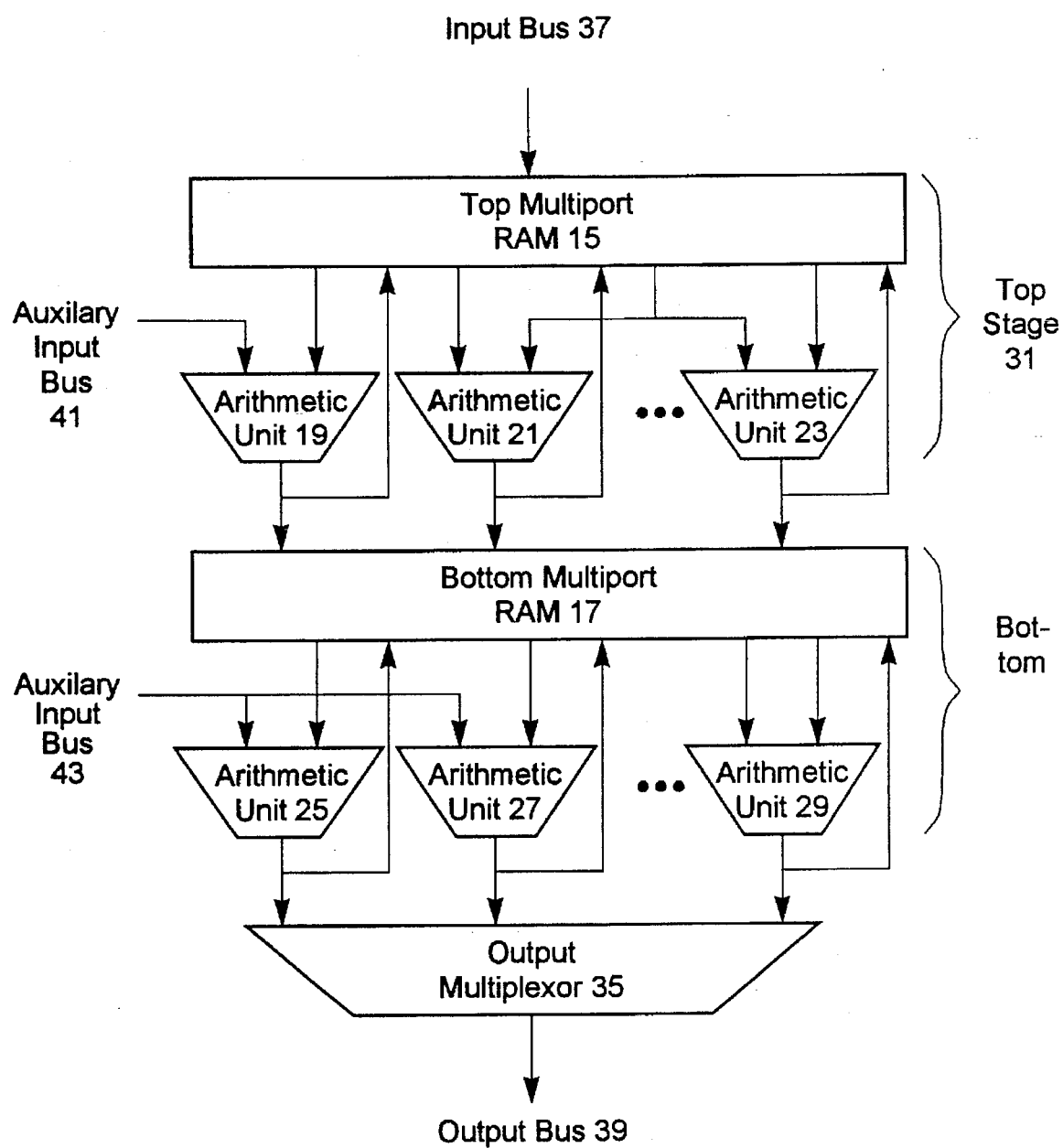
FIG. 2: General block diagram of a Two Stage Processor utilizing two multiport memories. Arithmetic Units (AUs) in the Top Stage get their operands from the Top Multiport RAM and the Arithmetic Units in the Bottom Stage get their operands from the Bottom Multiport RAM. AU outputs are both stored back into the same stage's multiport RAM and passed either to the next stage or the Output Bus.

The general block diagram of a Two Stage Processor utilizing two multiport memories 15, 17 and multiple AUs 19,21,23,25,27,29 is shown in FIG. 1. The architecture can be viewed as two cascaded stages: the Top Stage 31 and the Bottom Stage 33. In general, AUs 19,21,23 in the Top Stage 31 get their operands from the Top Multiport RAM 15 and the Arithmetic Units 25,27,29 in the Bottom Stage 33 get their operands from the Bottom Multiport RAM 17. There is not necessarily a one-to-one correspondence between outputs from Multiport RAM 15,17 read ports and AU 19,21, 23,25,27,29 operand inputs. AU outputs can be i) both stored back into the same stage's multiport RAM ii) passed either to the next stage or the Output Multiplexor 35, or iii) both of the previous. There is an Input Bus 37 and an Output Bus 39, thus allowing two simultaneous I/O operations. AUs 19,21,25 can also get operands from a Auxiliary Input Buses 41,43, which is necessary for special data, such as constant coefficients within elementary subroutines.

Figure 3:
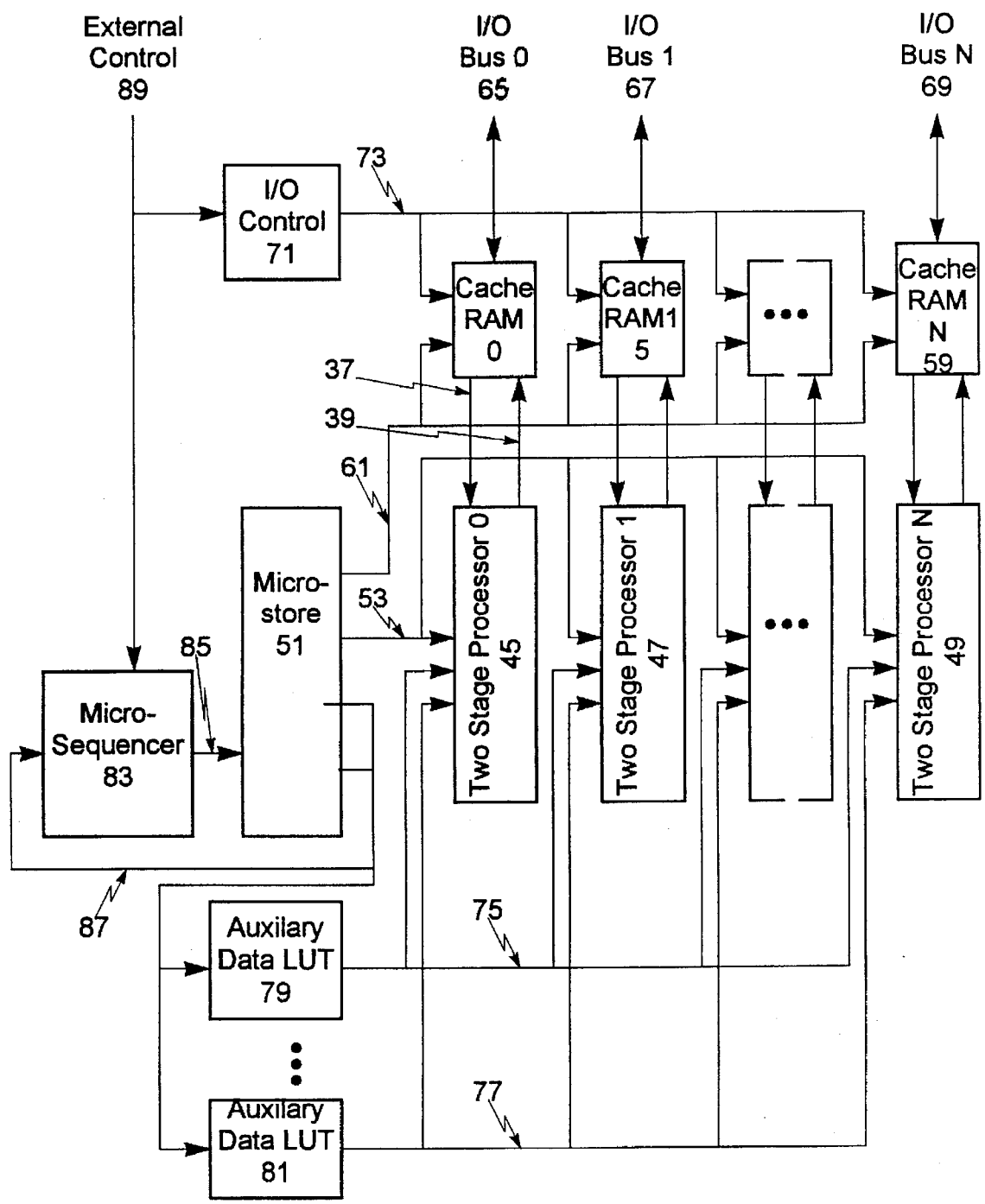
FIG. 3: SIMD architecture utilizing parallel Two Stage Processors.

Multiple Two Stage Processors 45,47,49 can operate in a SIMD configuration, and FIG. 3 shows N Two Stage Processors 45,47,49 running in parallel. Each Two Stage Processor 45,47,49 receives the same microcode instruction from the Microstore 51 via the Microinstruction Bus 53; hence the "Single Instruction" part of SIMD. The operations within a Two Stage Processor 45,47,49 are specified by single microcode instruction and these operations include: 1) all the operations of each AU 19,21,23,25,27,29,; 2) all multiport RAM 15,17 addresses and control; and 3) additional control bits, such as those for the Output Multiplexor 35. Therefore, one instruction specifies many operations. The Microstore 51 may include RAM, ROM, and logic, depending on the implementation. The Microstore 51 must be designed to account for pipe stages in AUs as well as for registers which could be placed at the input and output of RAMs.

Each Two Stage Processor 45,47,49 has its own Cache RAM 55,57,59 which supplies its data; hence the "Multiple Data" part of SIMD. Cache RAMs 55,57,59 can be multiport RAM, a set of bank-switched single-port RAMs, or a mixture of single-port and multiport RAMs. In FIG. 3, each Cache RAM 55,57,59 includes address generation for interfacing with both its I/O Bus and its Two Stage Processor 45,47,49; however, if the addresses for either of these interfaces was always the same, at least some of the address generation logic can be shared between Cache RAMs 55,57, 59. In either case, the address generation logic used for transfering data between Cache RAMs 55,57,59 and Two Stage Processors 45,47,49 is controled by bits from the Microstore 51 via the Cache Control Bus 61. Address generation logic used for transfering data between Cache RAMs 55,57,59 and the I/O Buses 65,67,69 is controled by bits from the I/O Controller 71 via the Cache Input/Output Control Bus 73.

The set of corresponding Auxilary Input Buses 75,77 for each Two Stage Processor 45,47,49 is driven by either an Auxilary Data Look-Up Table (LUT) 79,81 or directly from the Microstore 51. FIG. 3 shows two Auxilary Data LUTs 79,81, which are controlled by bits from the Microstore 51.

The address of the Microstore 51 comes from the Microsequencer 83 via the Microstore Address Bus 85. The Microsequencer 83, in turn, receives its instructions from the Microstore 51 via the Microsequencer Instruction Bus 87. Both the Microsequencer 51 and the I/O Controller 71 receive control signals via the External Control Bus 89.

When particular embodiments of the SIMD architecture and the Two Stage Processor 45,47,49 are considered for implementation, the number and type of AUs in each stage must be chosen. Also, the appropriate number of Auxilary Input Buses 41,43 must be included. There is a trade off between the number of Two Stage Processors 45,47,49 and the complexity of the Two Stage Processor 45,47,49.

DETAILED DESCRIPTIONS OF PREFERRED EMBODIMENTS

Many specific Two Stage Processor architectures are possible, hence, a preferred embodiment is presented to illustrate possible choices of AUs and multiport RAM configurations. The following prefered embodiments have been developed for image processing, with special attention to computation of motion vectors, Discrete Cosine Transforms (DCTs), and spatial filtering.

Architecture with Two Adders and a Multiply-Accumulate

Figure 4:
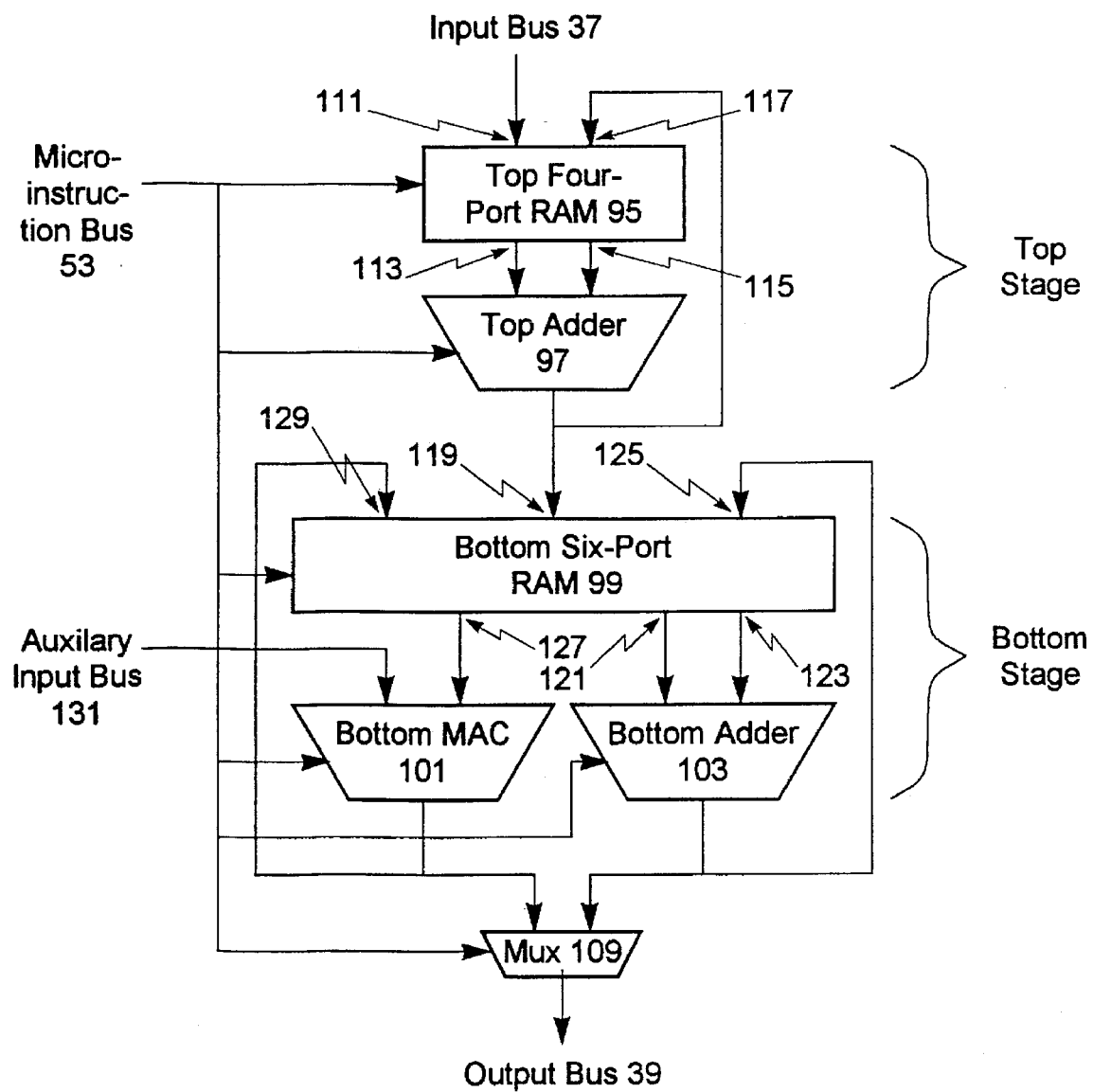
FIG. 4: A particular Two Stage Processor architecture utilizing parallel multiport memories. The Top stage consists of a four-port RAM and an adder. The Bottom Stage consists of a six-port RAM, a multiply-accumulator, and an adder.

The overview block diagram of the particular Two Stage Processor architecture within the scope of the present patent is shown in FIG. 4. The architecture can be viewed as two cascaded stages: the Top Stage 91 and the Bottom Stage 93. The Top Stage 91 consists of the Top Four-Port RAM 95 and The Top Adder 97. The Bottom Stage 93 consists of the Bottom Six-Port RAM 99, the Bottom Multiply-Accumulator 101, and the Bottom Adder 103. The Input Bus 37 supplies data to the Processor by inputting data into the Top Four-Port RAM 95. The Output Bus 39 of the Processor is driven by a Multiplexor 109 which chooses between the output of the Bottom Multiply-Accumulator 101 and the output of the Bottom Adder 103.

The two multiport RAMs 95,99 of FIG. 4 simultaneously perform ten RAM accesses. More specifically, the ten accesses are: 1) a write access 111 to the Top Four-Port RAM 95 from the Input Bus 37; 2) a read access 113 from the Top Four-Port RAM 95 for the first operand for the Top Adder 97; 3) a read access 115 from the Top Four-Port RAM 95 for the second operand for the Top Adder 97; 4) a write access 117 to the Top Four-Port RAM 95 from the output of the Top Adder 97; 5) a write access 119 to the Bottom Six-Port RAM 99 from the output of the Top Adder 97; 6) a read access 121 from the Bottom Six-Port RAM 99 for the first operand for the Bottom Adder 103; 7) a read access 123 from the Bottom Six-Port RAM 99 for the second operand for the Bottom Adder 103; 8) a write access 125 to the Bottom Six-Port RAM 99 from the output of the Bottom Adder 103; 9) a read access 127 from the Bottom Six-Port RAM 99 for the second operand for the Bottom Multiply-Accumulator 101; and 10) a write access 129 to the Bottom Six-Port RAM 99 from the output of the Bottom Multiply-Accumulator 101. For independent control of these ten RAM accesses 111,113,115,117,119,121,123,125,127,129, ten addresses and five write enable signals must be supplied by the Microinstruction Bus 53. The Microinstruction 53 Bus also supplies: i) the type of operations for the two adders, 97,103 namely, add, subtract, or pass data; and ii) the type of operation for the multiplier 101, namely, accumulate or not accumulate; and iii) the Output Multiplexor 109 select bit. The Microinstruction Bus 53 is shown explicity in FIG. 3 and FIG. 4, but for clarity, the Microinstruction Bus 53 is not shown in the other figures and is assumed to connect to all RAMs, AUs, Muxes, etc in each Two Stage Processor.

Also included in the architecture of FIG. 4 is one Auxilary Input Bus 131 for supplying the first Bottom Multiply-Accumulate 101 operand. In practice, an additional multiplexor could be added to the architecture to select between the Auxilary Input Bus 131 and the second Bottom Multiply-Accumulate 101 operand; thus allowing the microcode to either multiply a number read from the Bottom Six-Port RAM 99 by an external coefficient supplied by the Auxilary Input Bus 131 or to square the number read from the Bottom Six-Port RAM 99. The Output Bus 39 is driven by an Output Multiplexor 109, which selects between the output ot the Bottom Multiply-Accumulator 101 and the output of the Bottom Adder 103.

Inclusion of Complex Numbers

The square root of −1 is normally shown mathematically by $\sqrt{-1}$ and represented by the symbol j. Notation for a single complex number is a+jb, where a is the real part of the complex number and b is the imaginary part of the complex number. Hence, in computation hardware, two numbers are required to store the value of a single complex number.

Figure 5:
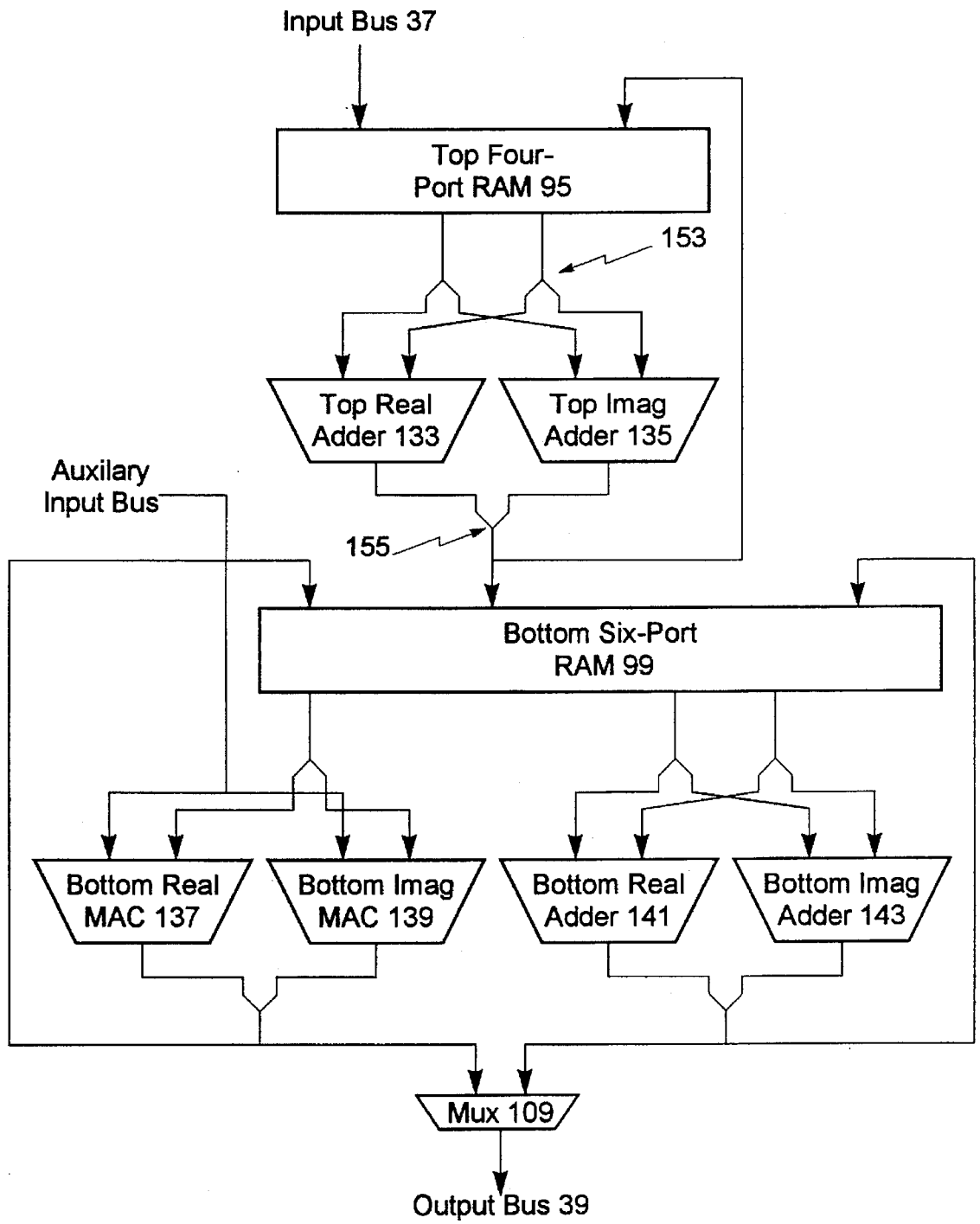
FIG. 5: Two Stage Processor Architecture similar to that of FIG. 4 except the number of Arithmetic Units has been doubled in order to allow direct manipulation of complex numbers.

The computational ability of the FIG. 4 architecture can be increased without increasing the number of read ports or write ports on the multiport RAMs 95,99 by storing two numbers in each multiport RAM location and doubling the number of AUs 97,101,103. It is important to keep the number of multiport RAM read ports and write ports to a minimum because it is important to keep the number of bits in the Microinstruction Bus 53 to a minimum. Such an architecture is illustrated in FIG. 5. Hence, the Top Adder 97 is replaced by the Top Real Adder 133 and the Top Imaginary Adder 135; the Bottom Multiply-Accumulate 101 is replaced by the Bottom Real Multiply-Accumulate (abbreviated MAC) 137 and the Bottom Imaginary Multiply-Accumulate 139; and the Bottom Adder 103 is replaced by the Bottom Real Adder 141 and the Bottom Imaginary Adder 143. The restriction of requiring two numbers to be stored in the same location is not overly restrictive if either: i) complex numbers are being manipulated; or ii) two sets of data are processed in parallel by the same Two Stage Processor 45,47,49. In FIG. 5, if complex numbers are being manipulated, both halves of all complex numbers are processed in parallel. The architecture of FIG. 5 is not a fully complex version of FIG. 4 because the Auxilary Input Bus 131 is used for real numbers, not complex numbers. The architecture of FIG. 4 could be made fully complex by changing all data buses, including the Auxilary Input Bus 131, to complex buses and by changing all AUs 97,101,103 to handle complex numbers on all their inputs.

In the figures, when a data bus splits into two buses (for example, one 32-bit bus splitting into two 16-bit buses), a "demerge" symbol 153 is used; and when two buses become unified into one bus, a "merge" symbol 155 is used. In FIG. 5, both the Input Bus 37 and the Output Bus 39 are used to transfer complex numbers.

Inclusion of Multiply by $\sqrt{-1}$ in Arithmetic Units

The process of multiplying a complex number by $\sqrt{-1}$, or j, can be done by swapping the real part of the complex number with the imaginary part and reversing the arithmetic sign of the new real part. Mathematically, this is j(a+jb)=−b+ja.

Figure 6:
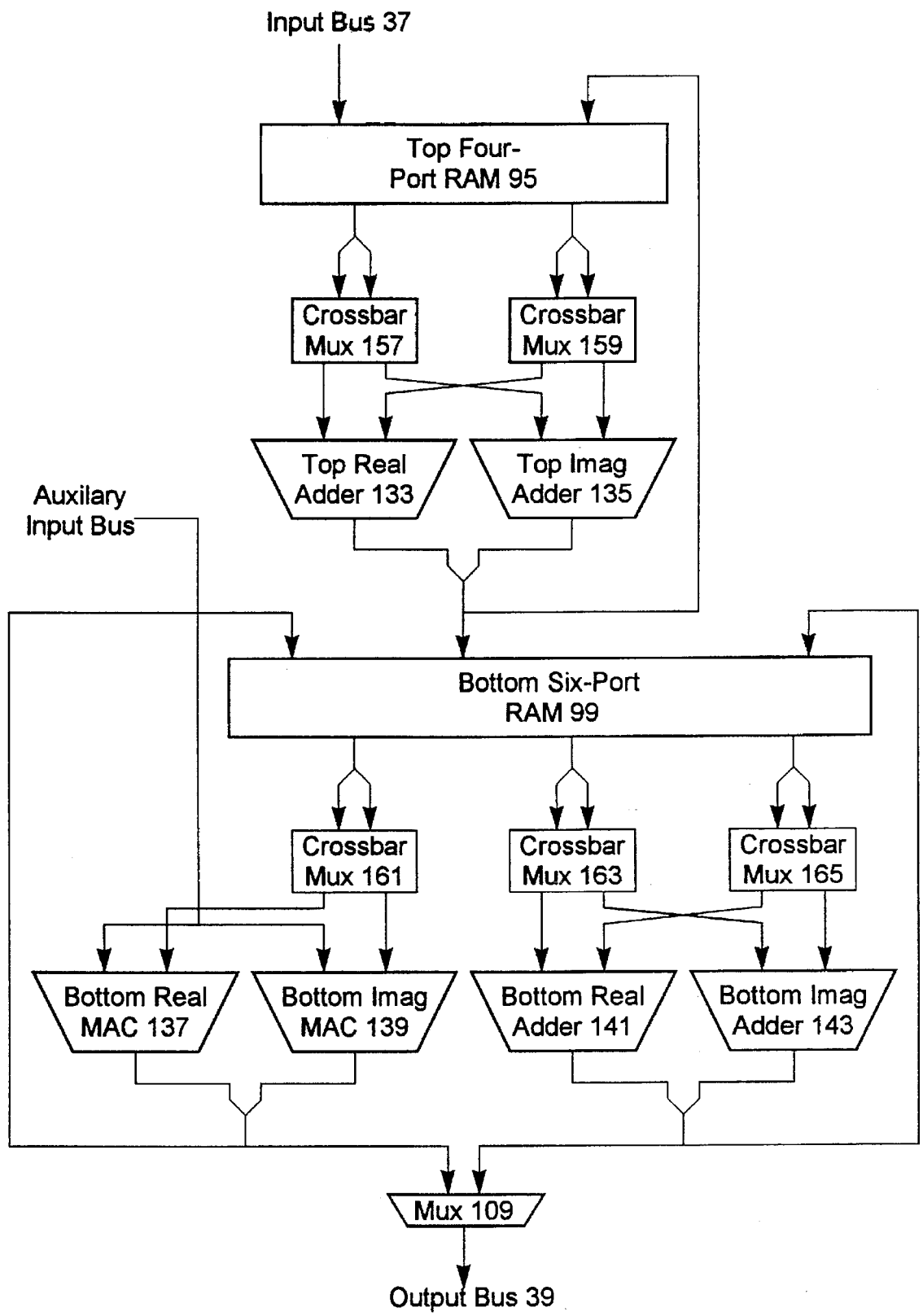
FIG. 6: Two Stage Processor Architecture similar to that of FIG. 5 except a Crossbar Multiplexor has been inserted after the all output buses for both multiport memories. These Crossbar Multiplexors allow swapping the real and imaginary parts of complex numbers before they are input to an Arithmetic Unit.

The architecture of FIG. 6 adds the capability of multiplying any AU operand by j by: i) adding Crossbar Multiplexors 157,159,161,163,165 after the read ports of the multiport RAMs 95,99, thereby optionally swapping the real and imaginary parts of a complex number; and ii) modifying the control bits supplied by the Microinstruction Bus 53 to the adders 133,135,141,143 and multipliers 137,139 to account for the arithmetic sign change. In FIG. 6, an AU may be considered to include both a Crossbar Multiplexor 157, 159, 161,163,165 and either an adder 133,135,141,143 or multiplier 137,139. In practice, since addition and multiplication are commutative (that is, a+b=b+a and ab=ba), only one Crossbar Mux could be required per pair of AUs (pairs are: 133 and 135; 137 and 139; 141 and 143) because many elementary subroutines can be written to require only one of the two operands to an adder or multiplier to be multiplied by j.

Reduction in the Number of Multipliers

Figure 7:
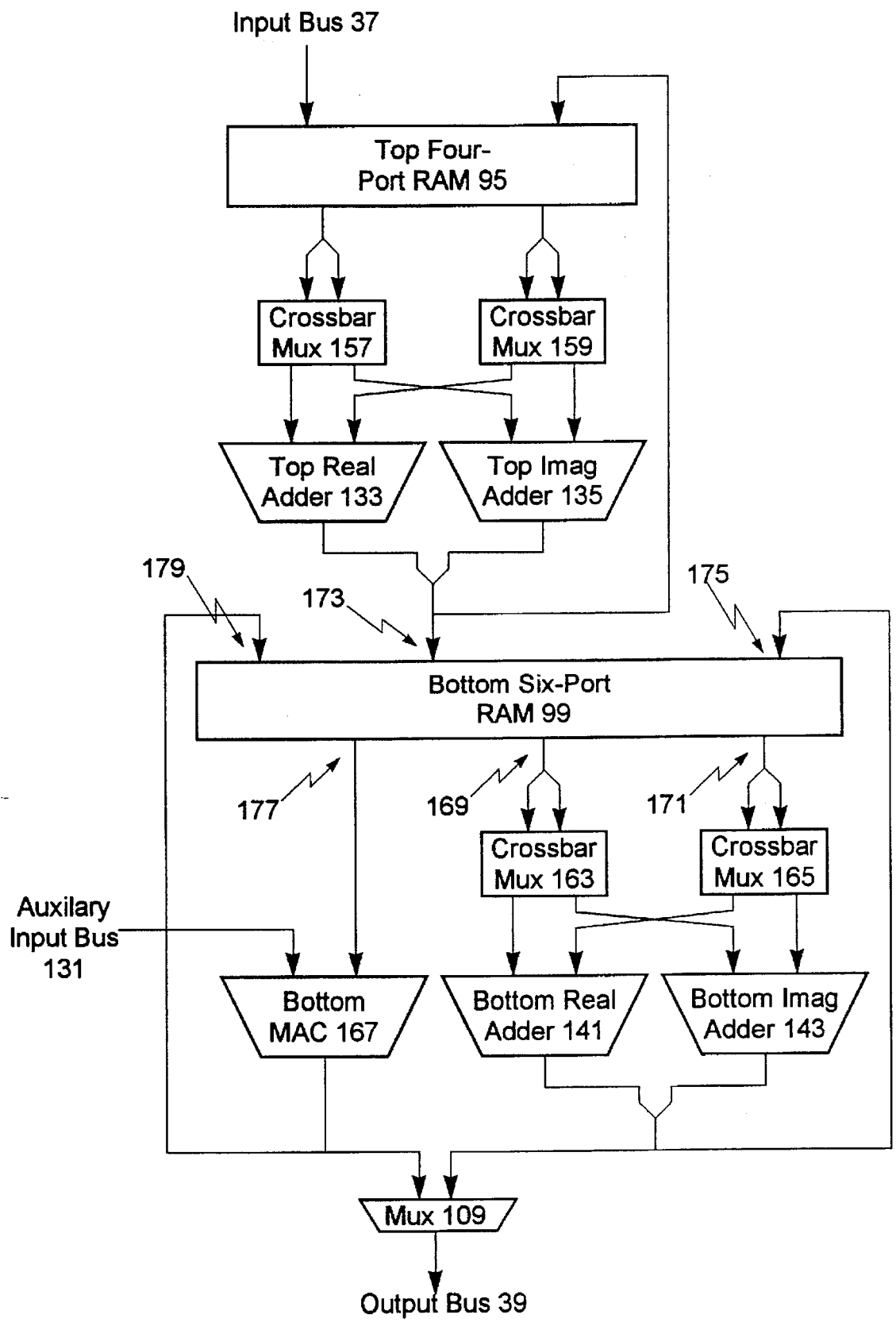
FIG. 7: Two Stage Processor Architecture similar to that of FIG. 6 except only one multiply-accumulator is included. If complex numbers are processed, the single multiply-accumulator, real and imaginary parts are multiplied sequentially.

In FIG. 7, a Two Stage Processor architecture is shown with only one Multiply-Accumulate 176, which is otherwise identical to that of FIG. 6. Since MAC functions are relatively expensive to implement, it is useful to reduce the number of MACs. Because of this fact, elementary subroutines are usually designed to minimize the number of required multiplies. A ratio of 4-to-1 between adds and multiply-accumulates can be achieved for many elementary subroutines of intrest. In the architecture of FIG. 7, the Bottom Six-Port RAM 99 has: i) two read ports 169,171 for complex numbers; ii) two write ports 173,175 for complex numbers; iii) one read port 177 for real numbers; and iv) one write port 179 for real numbers. For items iii and iv, the Bottom Six-Port RAM 99 must be able to separately read and write the real and imaginary parts of stored complex numbers. Hence, the Bottom Six-Port RAM 99 in FIG. 7 must has four write enables rather than three.

Figure 8:
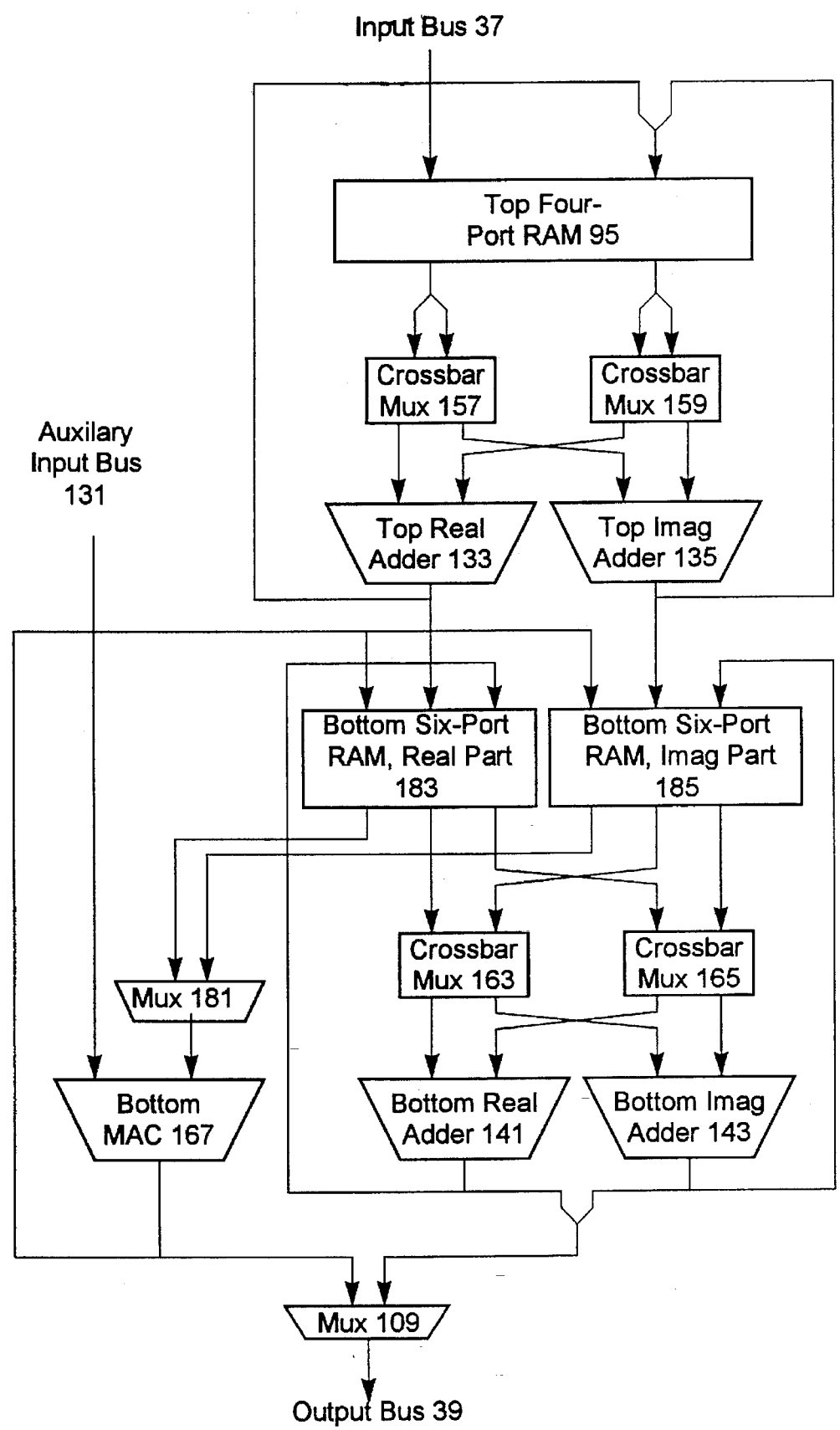
FIG. 8: Two Stage Processor Architecture similar to that of FIG. 7 except the six-port RAM has implemented with two separate RAM arrays: one RAM array for the real part and one RAM array for the imaginary part.

Since the Bottom Six-Port RAM 99 of FIG. 7 might be difficult to build, an alternative is presented in FIG. 8. The Bottom Six-Port RAM 99 is implemented with a Multiplexor 181 and two six-port RAMs 183,185: the Bottom Six-Port RAM, Real Part 183; and the Bottom Six-Port RAM, Imaginary Part 185. Four write enable signals must still be supplied, but two are shared by both RAMs 183,185.

Inclusion of Scale Factors in the AUs

In many elementary subroutines, arithmetic scale factors which are integer powers of 2 are included. For example, an operation such as z=x+2y can be done with an adder if it includes a scale factor capability. Another reason to include such scale factors is to account for different decimal positions in multiplier coefficients supplied by the Auxilary Input Bus 131.

Figure 9:
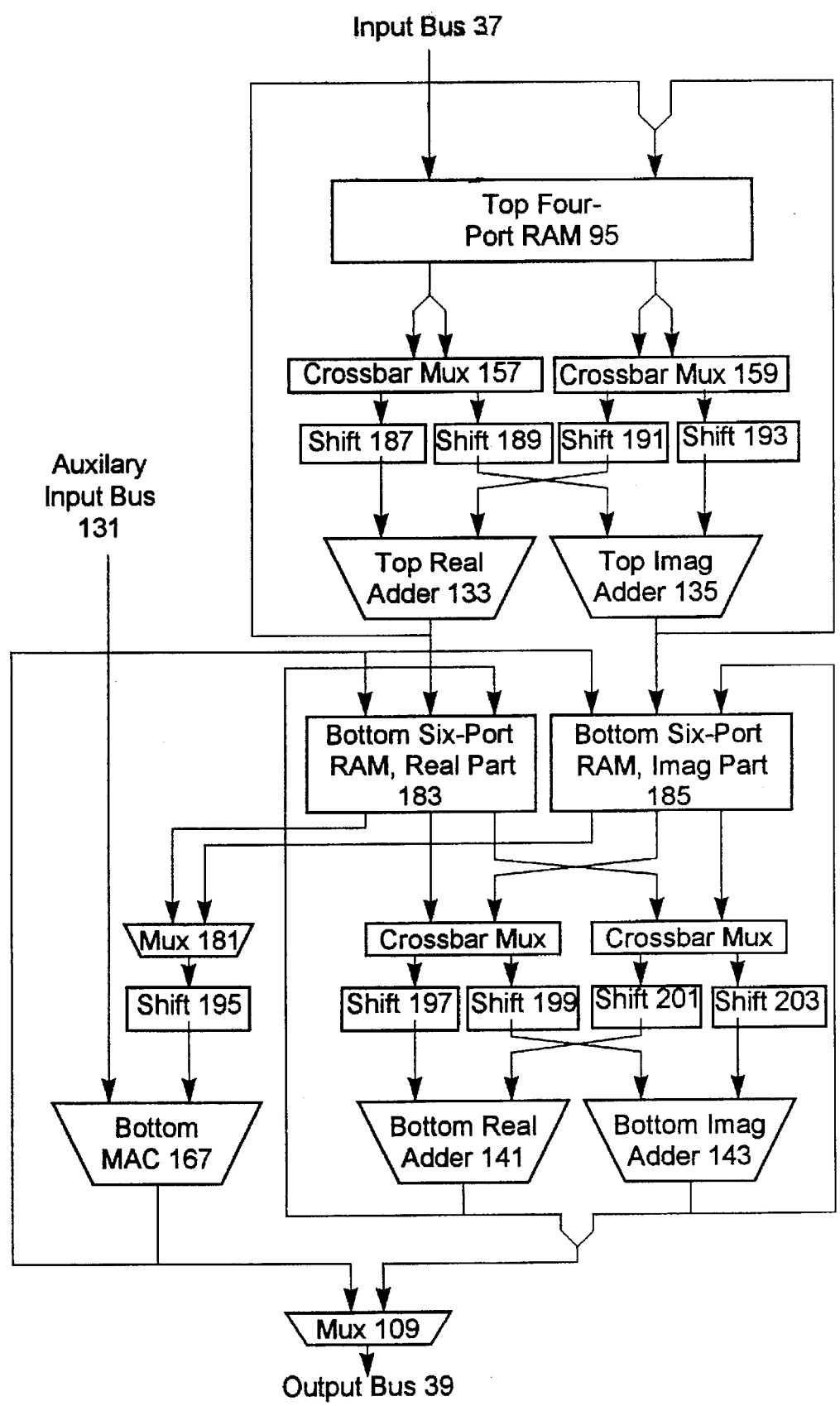
FIG. 9: Two Stage Processor Architecture similar to that of FIG. 8 except a shifter has been added to the input of Arithmetic Units.
Figure 10:
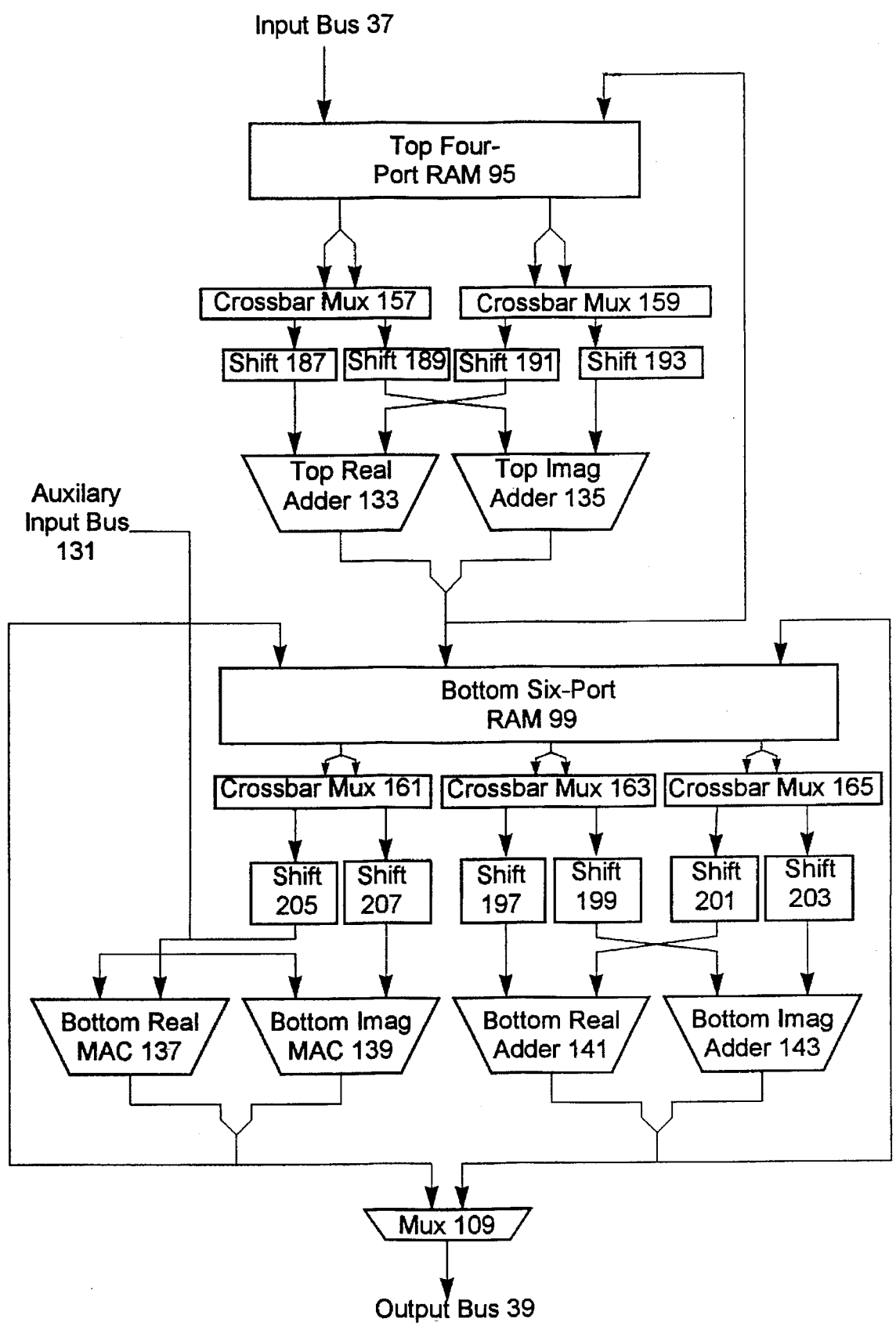
FIG. 10: shows another embodiment of the Two Stage Processor Architecture.

In FIG. 9, Shifters 187,189,191,193,195,197,199,201,203 have been added before the input of each AU 133,135,141, 143,167. These Shifters 187,189,191,193, 195,197,199,201, 203 can be designed to do right arithmetic shifts and/or left arithmetic shifts. If the AUs 133,135,141,143,167 are using floating point representation, the Shifter 187,189,191,193, 195,197,199,201,203 becomes an adder which is only applied to the exponent. In practice, since addition and multiplication are commutative, only one Shifter could be required per pair of AUs (pairs are: 133 and 135; 137 and 139; 141 and 143) because many elementary subroutines can be written to require only one of the two operands to an adder or multiplier to be scaled. Additionally, a shifter could be placed after the Output Multiplexor 109 in order scale the output as needed.

Dual Multipliers, Multiplication by $\sqrt{-1}$, and Scale Factors

If the features of multiplying by $\sqrt{-1}$, or j, and scale factors are added directly to the architecture of FIG. 6, the architecture of FIG. 6 results. This is also equivalent to the architecture of FIG. 9 where two multiply-accumulators 137,139 are included. Because there are two MACs 137,139, there must also be two Shifters 205,207.

What is claimed is:

1. A Single Instruction Multiple Data (SIMD) two-stage computational machine comprising:

a top computational stage directly cascaded to a bottom computational stage without any intermediate intervening computational stage;

said top computational stage including: top multi-port memory means for storing data having a plurality of inputs and a plurality of outputs; and at least one top arithmetic unit for processing said data coupled to at least one of the top memory means outputs, and each one of said top arithmetic units having an output coupled to at least one of the top memory means inputs;

said bottom computational stage including: bottom multi-port memory means for storing data having a plurality of inputs and a plurality of outputs, the bottom memory means inputs being directly coupled to the top arithmetic unit outputs without any intervening processor stages; and at least one bottom arithmetic unit for processing said data coupled to at least one of the bottom memory means outputs, and each one of said bottom arithmetic units having an output coupled to at least one of the bottom memory means inputs; and an instruction bus coupled to said top memory means, to said top arithmetic units, to said bottom memory means, and to said bottom arithmetic units, for simultaneously specifying the same single instruction to each stage of said two-stage computational machine, said single instruction simultaneously specifying a plurality of operations including all the operations of each of said top and bottom arithmetic units, and all memory means address and control operations; and a plurality of busses for providing simultaneous plural input and output operations, said plurality of busses including: an input bus for coupling operands from a first external operand source to said top memory means; an output bus for coupling arithmetic unit results stored in said bottom memory means to an external destination for said results; and at least one auxiliary data input means for optionally coupling special operands from a second external operand source to one of said top or bottom arithmetic units.

2. The computational machine recited in claim 1, further comprising:

an arithmetic unit output signal multiplexor coupled to said at least one bottom arithmetic unit outputs for selectively routing an output result of a selected one of said one or more bottom arithmetic units to said output bus, and wherein said single instruction further simultaneously providing additional control signals to control the output of said multiplexor.

3. The computational machine recited in claim 1, wherein said special operands include constant coefficients for use within elementary subroutines implemented by said cascaded stages.

4. The computational machine recited in claim 3, wherein said auxiliary data input means includes:

at least one auxiliary input bus coupled to one of said top arithmetic units or one of said bottom arithmetic units.

5. The computational machine recited in claim 3, further comprising:

auxiliary data storage means for storing said special operands coupled to said auxiliary data input means.

6. The computational machine recited in claim 1, wherein:

said top memory means is a four port RAM;

said at least one top arithmetic unit comprises an adder;

said bottom memory means is a six port RAM; and said at least one bottom arithmetic units comprise a multiply-accumulator and an adder.

7. The computational machine recited in claim 1, wherein:

said top memory means is a four port RAM;

said at least one top arithmetic units are a first top adder and a second top adder;

said bottom memory means is a six port RAM; and said at least one bottom arithmetic units are first and second multiply-accumulators and first and second bottom adders.

8. The computational machine recited in claim 7, wherein:

said first top adder, said first multiply-accumulator and said first bottom adder process the real portion of a complex number; and said second top adder, said second multiply-accumulator and said second bottom adder process the imaginary portion of said complex number.

9. The computational machine recited in claim 7, further comprising:

a plurality of crossbar multiplexors coupled between said top memory means and said top arithmetic units and coupled between said bottom memory means and said bottom arithmetic units.

10. The computational machine recited in claim 1, wherein:

said top memory means is a four port RAM;

said top arithmetic units are a first top adder and a second top adder;

said bottom memory means is a six port RAM; and said bottom arithmetic units are a multiply-accumulator and first and second bottom adders.

11. The computational machine recited in claim 10, wherein:

said first top adder and said first bottom adder process the real portion of a complex number; and said second top adder and said second bottom adder process the imaginary portion of said complex number.

12. The computational machine recited in claim 10, further comprising:
a plurality of crossbar multiplexors coupled between said top memory means and said top arithmetic units and coupled between said bottom memory means and said bottom arithmetic units.

13. The computational machine recited in claim 1, wherein:
said top memory means is a four port RAM;
said top arithmetic units are a first top adder and a second top adder;
said bottom memory means is a first six port RAM and a second six port RAM; and
said bottom arithmetic units are a multiply-accumulator and first and second bottom adders; and
further comprising a multiplexor coupled between said multiply-accumulator and said bottom memory means.

14. The computational machine recited in claim 13, wherein:
said first top adder, said first six port RAM and said first bottom adder process the real portion of a complex number; and
said second top adder, said second six port RAM and said second bottom adder process the imaginary portion of said complex number.

15. The computational machine recited in claim 13, further comprising:
a plurality of crossbar multiplexors coupled between said top memory means and said top arithmetic units and coupled between said bottom memory means and said bottom arithmetic units.

16. The computational machine recited in claim 1, wherein:
said top memory means is a four port RAM;
said top arithmetic units are a first top adder and a second top adder;
said bottom memory means is a first six port RAM and a second six port RAM; and
said bottom arithmetic units are a multiply-accumulator and first and second bottom adders; and
further comprising a multiplexor coupled between said multiply-accumulator and said bottom memory means, and a plurality of shifters coupled between said top memory means and said top arithmetic units and coupled between said bottom memory means and said bottom arithmetic units.

17. The computational machine recited in claim 16, wherein:
said first top adder, said first six port RAM and said first bottom adder process the real portion of a complex number; and
said second top adder, said second six port RAM and said second bottom adder process the imaginary portion of said complex number.

18. The computational machine recited in claim 16, further comprising:
a plurality of crossbar multiplexors coupled between said top memory means and said top arithmetic units and coupled between said bottom memory means and said bottom arithmetic units.

19. The computational machine recited in claim 1, wherein:
said top memory means is a four port RAM;
said top arithmetic units are a first top adder and a second top adder;
said bottom memory means is a six port RAM; and
said bottom arithmetic units are first and second multiply-accumulators and first and second bottom adders; and
further comprising a plurality of shifters coupled between said top memory means and said top arithmetic units and coupled between said bottom memory means and said bottom arithmetic units.

20. The computational machine recited in claim 19, wherein:
said first top adder, said first multiply-accumulator and said first bottom adder process the real portion of a complex number; and
said second top adder, said second multiply-accumulator and said second bottom adder process the imaginary portion of said complex number.

21. The computational machine recited in claim 19, further comprising:
a plurality of crossbar multiplexors coupled between said top memory means and said top arithmetic units and coupled between said bottom memory means and said bottom arithmetic units.

22. The computational machine in claim 1, wherein at least one of said top or said bottom computational stages includes a plurality of arithmetic units for processing said data, each of said plurality of arithmetic units in any particular stage being coupled to said respective top or bottom memory means for simultaneous transmission of data stored in said memory means into each of said plurality of arithmetic units within said particular stage.

23. The computational machine in claim 5, wherein at least one of said top or said bottom computational stages includes a plurality of arithmetic units for processing said data, each of said plurality of arithmetic units in any particular stage being coupled to said respective top or bottom memory means for simultaneous transmission of data stored in said memory means into each of said plurality of arithmetic units within said particular stage.

24. A Single Instruction Multiple Data (SIMD) computational machine comprising:
a plurality of two stage processing machines for simultaneously processing multiple data sets;
a plurality of data memory means each one coupled to one of said two stage processing machines for storing said multiple data sets;
an instruction control means for controlling the operation of said two stage processing machine by simultaneously providing a single instruction to all of said two stage processing machines, said single instruction specifying a plurality of operations;
an input/output control means for generating address signals to control transfer of said multiple data sets between at least two of said two stage processing machine and said data memory means; and wherein
each of said plurality of two-stage processing machines for simultaneously processing multiple data comprises:
a top computational stage directly cascaded to a bottom computational stage without any intermediate intervening computational stage;
said top stage including:
a top multi-port memory means for storing data having a plurality of inputs and a plurality of outputs; and at least one top arithmetic unit for processing said data coupled to at least one of the top memory means outputs and each one of said top arithmetic units having an output coupled to at least one of the top memory means inputs;

said bottom stage including:
a bottom multi-port memory means for storing data having a plurality of inputs and a plurality of outputs, the bottom memory means inputs being directly coupled to the top arithmetic unit outputs without any intervening processor stages; and
at least one bottom arithmetic unit for processing said data coupled to at least one of the bottom memory means outputs and each one of said bottom arithmetic units having an output coupled to at least one of the bottom memory means inputs;
an instruction bus coupled to said top memory means, said top arithmetic units, said bottom memory means, and said bottom arithmetic units for simultaneously specifying the same single instruction to each stage of said two-stage computational machine, said single instruction simultaneously specifying a plurality of operations including all the operations of each of said arithmetic units, and all memory means address and control operations; and
a plurality of busses for providing simultaneous plural input and output operations, said plurality of busses including:
an input bus for coupling operands from a first external operand source to said top memory means;
an output bus for coupling arithmetic unit results stored in said bottom memory means to an external destination for said results;
at least one auxiliary data input means for optionally coupling special operands from a second external operand source to one of said top or bottom arithmetic units; and
an arithmetic unit output signal multiplexor coupled to said plurality of bottom arithmetic unit outputs for selectively routing an output result of a selected one of said one or more bottom arithmetic units to said output bus, and wherein said single instruction further simultaneously providing additional control signals to control the output of said multiplexor; and
wherein said top memory means comprises a four port RAM, said at least one top arithmetic unit comprises an adder; said bottom memory means comprises a six port RAM, and said at least one bottom arithmetic units comprise a multiply-accumulator and an adder.

25. The computational machine recited in claim 24, further comprising:
an auxiliary data bus for providing special operands to said two stage processing machine.

26. The computational machine recited in claim 24, further comprising:
an external controller for providing control signals to said input output control means and said instruction control means.

27. The computational machine of claim 24, wherein said instruction control means includes:
an instruction memory for storing a plurality of instructions; and
an instruction address generator coupled to said instruction memory, for generating an instruction address and providing said instruction address to said instruction memory for selecting said single instruction from said plurality of instructions; and
an input/output control bus for addressing said two stage processing means and said data memory means.

28. The computational machine in claim 24, wherein:
said at least one top arithmetic unit comprises a plurality of top arithmetic units;
said at least one bottom arithmetic unit comprises a plurality of bottom arithmetic units;
said top memory means comprises a single top memory storage unit;
said bottom memory means comprises a single bottom memory storage unit; and
each of said plurality of arithmetic units in said top computational stage are coupled to said top memory storage unit for simultaneous transmission of data stored in said top memory unit into each of said plurality of arithmetic units within said top computational stage; and
each of said plurality of arithmetic units in said bottom computational stage are coupled to said bottom memory storage unit for simultaneous transmission of data stored in said bottom memory unit into each of said plurality of arithmetic units within said bottom computational stage.

29. A Single Instruction Multiple Data multi-stage computational machine comprising:
a plurality of two stage processing machines for simultaneously processing multiple data sets, each said two stage processing machine comprising a top stage having a first multi-port memory and a first arithmetic unit, and a bottom stage having a second multi-port memory and a second arithmetic unit;
a plurality of data memories each one coupled to one of said two stage processing machines for storing said multiple data;
an instruction controller for controlling the operation of said two stage processing machines by simultaneously providing a single instruction to all of said two stage processing machines, said single instruction specifying a plurality of operations;
an input/output controller for generating address signals to control transfer of said multiple data between said two stage processing machines and said data memories.

30. A Single Instruction Multiple Data (SIMD) two-stage computational machine comprising:
a top computational stage directly cascaded to a bottom computational stage without any intermediate intervening computational stage;
said top computational stage including: a top multi-port memory for storing data having a plurality of inputs and a plurality of outputs; and a plurality of top arithmetic units for processing said data coupled to at least one of the top memory outputs, and each one of said top arithmetic units having an output coupled to at least one of the top memory inputs;
said bottom computational stage including: a bottom multi-port memory for storing data having a plurality of inputs and a plurality of outputs, the bottom memory inputs being directly coupled to the top arithmetic unit outputs without any intervening processor stages; and a plurality of bottom arithmetic unit for processing said data coupled to at least one of the bottom memory outputs, and each one of said bottom arithmetic units having an output coupled to at least one of the bottom memory inputs; and an instruction bus coupled to said top memory, to said top arithmetic units, to said bottom memory, and to said bottom arithmetic units, for simultaneously specifying the same single instruction to each stage of said two-stage computational machine, said single instruction simultaneously specifying a plurality of operations including all the operations of each of said top and bottom arithmetic units, and all memory address and control operations;

each of said plurality of arithmetic units in any particular stage being coupled to said respective memory within said stage for simultaneous transmission of data stored in said memory means into each of said plurality of arithmetic units within said particular stage;

a plurality of busses for providing simultaneous plural input and output operations, said plurality of busses including: an input bus for coupling operands from a first external operand source to said top memory; an output bus for coupling arithmetic unit results stored in said bottom memory to an external destination for said results; and at least one auxiliary data input port for optionally coupling special operands from a second external operand source to one of said top or bottom arithmetic units;

an arithmetic unit output signal multiplexor coupled to said plurality of bottom arithmetic unit outputs for selectively routing an output result of a selected one of said bottom arithmetic units to said output bus, and wherein said single instruction further simultaneously providing additional control signals to control the output of said multiplexor;

an auxiliary data input bus coupled to one of said top arithmetic units or one of said bottom arithmetic units for providing special operands to said top or bottom arithmetic units; and auxiliary data storage means for storing said special operands coupled to said auxiliary data input bus.

* * * * *